(12) United States Patent
Jeong et al.

(10) Patent No.: US 10,305,092 B2
(45) Date of Patent: May 28, 2019

(54) METHOD OF PREPARING POSITIVE ELECTRODE ACTIVE MATERIAL-SOLID ELECTROLYTE COMPLEX FOR ALL-SOLID-STATE LITHIUM SULFUR BATTERY

(71) Applicants: Hyundai Motor Company, Seoul (KR); Industry-University Cooperation Foundation Hanyang University, Seoul (KR)

(72) Inventors: Kyoung Jin Jeong, Seoul (KR); Hee Yeon Ryu, Yongin-si (KR); Min Yong Eom, Seoul (KR); Dong Wook Shin, Seongnam-si (KR)

(73) Assignees: Hyundai Motor Company, Seoul (KR); Industry-University Cooperation Foundation Hanyang University, Seoul (KR)

( * ) Notice: Subject to any disclaimer, the term of this patent is extended or adjusted under 35 U.S.C. 154(b) by 41 days.

(21) Appl. No.: 14/983,400

(22) Filed: Dec. 29, 2015

(65) Prior Publication Data

US 2016/0351964 A1 Dec. 1, 2016

(30) Foreign Application Priority Data

May 29, 2015 (KR) .......................... 10-2015-0076100

(51) Int. Cl.
*H01M 4/1397* (2010.01)
*H01M 4/00* (2006.01)
(Continued)

(52) U.S. Cl.
CPC ....... *H01M 4/1397* (2013.01); *H01M 4/0471* (2013.01); *H01M 4/5815* (2013.01);
(Continued)

(58) Field of Classification Search
CPC ........... H01M 10/0585; H01M 4/0471; H01M 4/1397; H01M 4/364; H01M 10/052; H01M 10/0562; H01M 2004/028
(Continued)

(56) References Cited

U.S. PATENT DOCUMENTS

2011/0049745 A1* 3/2011 Katayama ......... H01M 10/0562
264/104
2013/0164631 A1* 6/2013 Ohtomo ............ H01M 10/0525
429/319

(Continued)

FOREIGN PATENT DOCUMENTS

JP 8-148180 A 6/1996
JP 6375418 B2 12/2013
(Continued)

*Primary Examiner* — Mark Kopec
*Assistant Examiner* — Danny N Kang
(74) *Attorney, Agent, or Firm* — Morgan Lewis & Bockius LLP

(57) ABSTRACT

A method of preparing a positive electrode active material-solid electrolyte complex for an all-solid-state lithium sulfur battery includes mixing a sulfide based solid electrolyte, which includes $Li_2S$ and $P_2S_5$, and a positive electrode active material to prepare a mixture; milling the mixture to amorphize the mixture; and heat-treating the amorphized mixture.

4 Claims, 5 Drawing Sheets

(51) Int. Cl.
  H01M 10/00   (2006.01)
  H01M 4/04    (2006.01)
  H01M 4/58    (2010.01)
  H01M 4/62    (2006.01)
  H01M 10/052      (2010.01)
  H01M 10/0562     (2010.01)
  H01M 4/02        (2006.01)
  H01M 4/38        (2006.01)

(52) U.S. Cl.
  CPC ............... H01M 4/62 (2013.01); *H01M 4/38* (2013.01); *H01M 4/382* (2013.01); *H01M 10/052* (2013.01); *H01M 10/0562* (2013.01); *H01M 2004/028* (2013.01); *H01M 2300/0068* (2013.01)

(58) Field of Classification Search
  USPC ........................................................ 252/500
  See application file for complete search history.

(56) References Cited

U.S. PATENT DOCUMENTS

| 2014/0127588 | A1* | 5/2014 | Kato ...................... H01B 1/122 |
| | | | 429/304 |
| 2014/0315102 | A1* | 10/2014 | Tsuji ...................... H01M 4/38 |
| | | | 429/322 |
| 2015/0024280 | A1* | 1/2015 | Uchiyama ............. H01M 4/505 |
| | | | 429/304 |

FOREIGN PATENT DOCUMENTS

| JP | 2014-116136 A     | 6/2014 |
| KR | 10-2014-0073400 A | 6/2014 |
| KR | 10-2015-0035574 A | 4/2015 |

\* cited by examiner

- Related Art --

METHOD OF PREPARING POSITIVE ELECTRODE ACTIVE MATERIAL-SOLID ELECTROLYTE COMPLEX FOR ALL-SOLID-STATE LITHIUM SULFUR BATTERY

CROSS-REFERENCE TO RELATED APPLICATION

This application claims under 35 U.S.C. § 119(a) the benefit of priority to Korean Patent Application No. 10-2015-0076100 filed on May 29, 2015, the entire content of which is incorporated herein by reference.

TECHNICAL FIELD

The present disclosure relates to a method of preparing a positive electrode active material-solid electrolyte complex for an all-solid-state lithium sulfur battery.

BACKGROUND

Today, secondary batteries are broadly used in large devices such as vehicles, power storage systems, etc., and small devices such as mobile phones, camcorders, laptops, etc.

Lithium ion batteries have been mainly used as the secondary batteries due to high energy density and a large capacity per unit area, when compared with nickel-manganese batteries or nickel-cadmium batteries.

However, the lithium secondary batteries are not suitable as next generation batteries for vehicles, since the lithium secondary batteries are easily heated, energy density thereof is approximately 360 Wh/kg, and output thereof is poor.

FIG. 1 illustrates a lithium sulfur battery during charge and discharge according to the related art.

A conventional lithium sulfur battery includes a positive electrode, a lithium negative electrode, and an electrolyte layer disposed between the positive electrode and the lithium negative electrode. The positive electrode includes a positive electrode active material (sulfur), a conductive material, a liquid electrolyte, and a binder.

When the lithium sulfur battery is discharged, electrons migrate to the positive electrode from the lithium negative electrode. When migrating along the conductive material in the positive electrode, the electrons bind to a positive electrode active material (sulfur) adjacent to a surface of the conductive material. The positive electrode active material (sulfur) is reduced to $S_8^{2-}$, and $S_8^{2-}$ forms $Li_2S_8$ by binding with lithium ions. $Li_2S_8$ continuously reacts with the lithium ions to be precipitated into $Li_2S_2/Li_2S$ on the surface of the lithium negative electrode.

When the battery is charged, an oxidation reaction reversely occurs to form $S_8^{2-}$, and $S_8^{2-}$ loses electrons thereof on the surface of the conductive material to be oxidized to the positive electrode active material (sulfur).

The conventional lithium sulfur battery uses a liquid electrolyte. Since most liquid electrolytes are flammable organic materials, there is a high risk of fire and explosion at high temperature. In addition, some lithium sulfur compounds generated during charge and discharge are dissolved in a liquid electrolyte, and thus, lifespan of a battery deteriorates.

Accordingly, interest for all-solid-state lithium sulfur batteries having a high output and a high energy density has been dramatically increased.

The all-solid-state lithium sulfur batteries use a solid electrolyte instead of the liquid electrolyte, thus preventing the above problems.

Since the all-solid-state lithium sulfur batteries have a theoretical energy density of approximately 2600 Wh/kg that is approximately seven times higher than conventional lithium ion batteries, the all-solid-state lithium sulfur batteries are suitable as a power source for electric vehicles.

In addition, since the all-solid-state lithium sulfur batteries use a solid electrolyte, problems such as electrolyte leakage, fire, etc. generated in lithium sulfur batteries using a liquid electrolyte are prevented.

Solid electrodes are classified into oxide based electrodes and sulfide based electrodes. The sulfide based solid electrolytes are generally used since the electrodes have higher lithium ionic conductivity and are stable in a broad voltage range, when compared with the oxide based solid electrolyte.

For example, in the related art, discharge capacity and lifespan of a battery were improved by using $Li_2S$—$P_2S_5$ as a sulfide based solid electrolyte.

When the all-solid-state lithium sulfur batteries are manufactured, a contact area between the positive electrode active material and the solid electrolyte and a distribution pattern impact battery performance significantly. Accordingly, studies have been conducted to resolve the above problems by preparing a complex of the positive electrode active material and the solid electrolyte through mechanical milling.

Such all-solid-state lithium sulfur batteries include a complex electrode in which an electrode active material, a solid electrolyte and a conductive material are mixed. Since the size and the shape of each component of the complex electrode are different, the components are non-uniformly distributed in the complex electrode. Therefore, an interface between each component, particularly an interface between the electrode active material and the solid electrolyte, is not consistently formed, and thus, battery performance is deteriorated.

SUMMARY OF THE DISCLOSURE

The present disclosure has been made in an effort to solve the above-described problems associated with the prior art.

One object of the present inventive concept is to provide a preparation method of uniformly distributing a positive electrode active material and a sulfide based solid electrolyte in a positive electrode.

Another object of the present inventive concept is to provide a preparation method of extending a contact area of a positive electrode active material and a sulfide based solid electrolyte in a positive electrode, and uniformizing a distribution pattern thereof.

Objects of the present inventive concept are not limited to the objects referred above. Objects of the present inventive concept will be more clarified through descriptions below and will be realized by means disclosed in the appended claims and combinations thereof.

In order to achieve the objects, the present disclosure includes embodiments as follows.

According to an embodiment in the present disclosure, a method of preparing a positive electrode active material-solid electrolyte complex for an all-solid-state lithium sulfur battery includes: 1) mixing a sulfide based solid electrolyte, which includes $Li_2S$ and $P_2S_5$, and a positive electrode active material to prepare a mixture, 2) milling the mixture to amorphize the same, and 3) heat-treating the amorphized mixture.

The positive electrode active material may include lithium ions.

The positive electrode active material may be lithium sulfide ($Li_2S$).

The mechanical milling may be carried out by planetary ball milling.

In the mechanical milling, the mixture may be ground for 20 to 25 hours at 300 to 600 RPM.

The heat-treating may be carried out at 210 to 250° C.

According to the method of the present disclosure, a positive electrode active material and a sulfide based solid electrolyte in a positive electrode may be uniformly distributed.

Further, a contact area of a positive electrode active material and a sulfide based solid electrolyte in a positive electrode may extend and a distribution pattern may be uniformly formed.

Furthermore, the positive electrode active material and the solid electrolyte may contact intimately because they are milled and mixed using high energy milling like planetary ball mill.

In addition, discharge capacity and lifespan of the batteries may increase.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Figure 1:
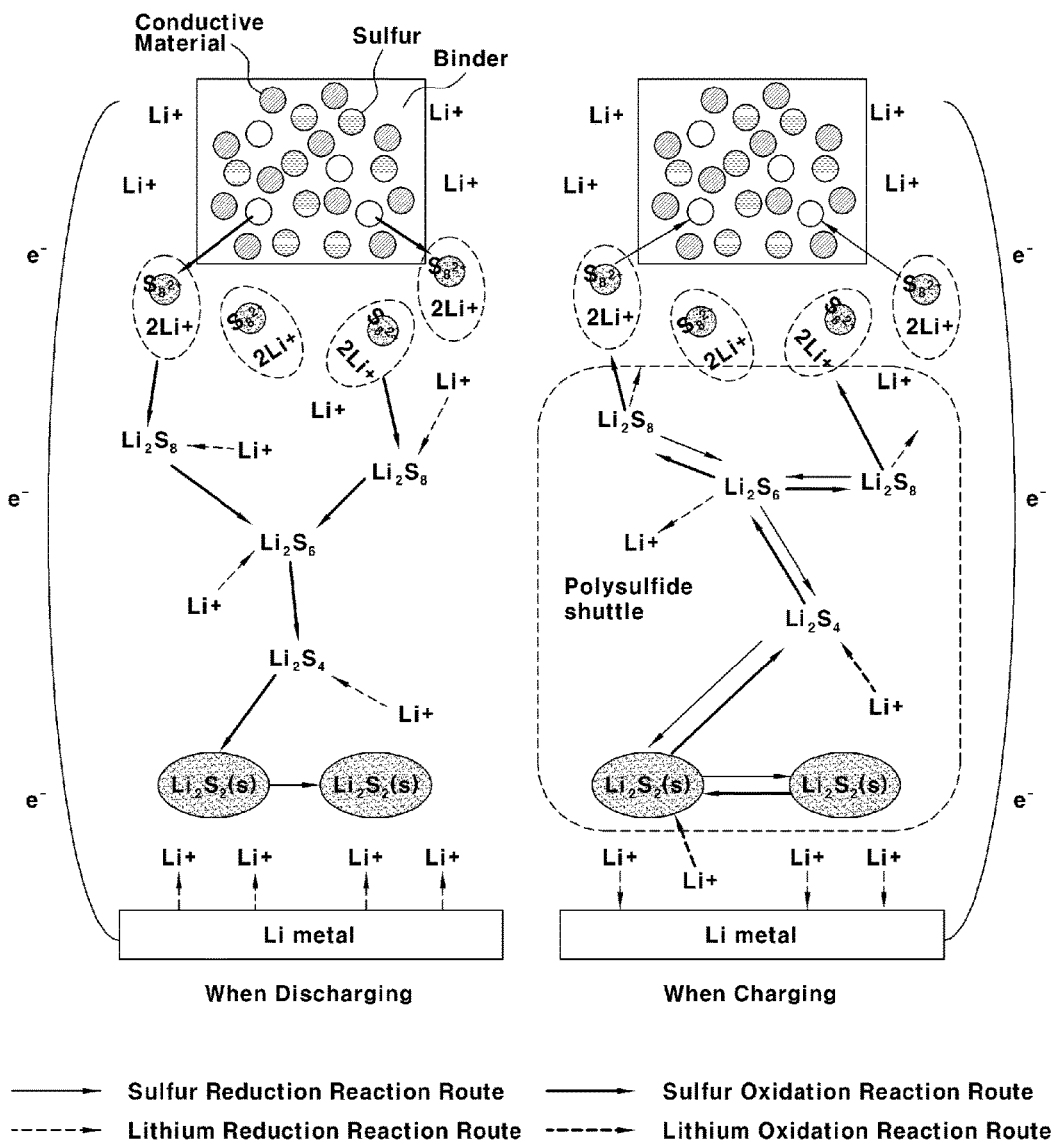
FIG. 1 illustrates mechanisms of a lithium sulfur battery during charge and discharge according to the related art.

Hereinafter reference will now be made in detail to various embodiments, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

In the description of the present disclosure, certain detailed explanations of related art are omitted when it is deemed that they may unnecessarily obscure the essence of the invention. Throughout this specification, unless explicitly described to the contrary, the expression "including" will be understood to imply the inclusion of stated elements but not the exclusion of any other elements.

An all-solid-state lithium sulfur battery according to the present disclosure may include a positive electrode, a negative electrode, and a solid electrolyte layer.

The positive electrode may include a positive electrode active material-solid electrolyte complex, a conductive material, and a binder.

The positive electrode active material-solid electrolyte complex may be prepared using the positive electrode active material and the solid electrolyte as starting materials. The complex is prepared by mechanically milling the positive electrode active material and the solid electrolyte to amorphize the same. Accordingly, a contact area of the positive electrode active material and the solid electrolyte is wide, and an interface resistance thereof is low due to uniform distribution, as compared with a conventional all-solid-state lithium sulfur battery. Detailed description therefor is described below.

The positive electrode active material may use a material including sulfur or lithium sulfide ($Li_2S$).

To properly operate the all-solid-state lithium sulfur battery, a sufficient amount of lithium ions should be present in the battery. When sulfur is used as a positive electrode active material, it is impossible to satisfy the amount thereof. Accordingly, as a negative electrode, a material into which a lithium metal or lithium ions are inserted should be used. However, when a lithium metal is used as a negative electrode, short circuit within the battery due to dendrite growth of lithium may be possible.

When lithium sulfide is used as a positive electrode active material, a positive electrode contains some lithium ions, and thus, a material used as a negative electrode may be freely selected. That is, since a lithium metal is not essential, short circuit of the battery due to dendrite growth of lithium may be prevented.

As the solid electrolyte, a sulfide based solid electrolyte, particularly a sulfide based solid electrolyte including $Li_2S$ and $P_2S_5$, may be used.

The sulfide based solid electrolyte has a high lithium ionic conductivity of $5 \times 10^{-4}$ S/cm or more at room temperature and is stable in a broad voltage range.

In addition, referring back to FIG. 1, a final product is lithium sulfide when the lithium sulfur battery is discharged. Accordingly, when the sulfide based solid electrolyte is used, interface resistance may be dramatically decreased in that similar sulfide is used.

The method of preparing the positive electrode active material-solid electrolyte complex for an all-solid-state lithium sulfur battery according to the present invention may include 1) mixing a sulfide based solid electrolyte, including $Li_2S$ and $P_2S_5$, and a positive electrode active material to prepare a mixture, 2) milling the mixture to amorphize the same and 3) heat-treating the amorphized mixture.

The mechanical milling is a step of milling the sulfide based solid electrolyte and the positive electrode active material according to a specific method and a specific condition to amorphize the same. Accordingly, as compared with simply mixing the sulfide based solid electrolyte and the positive electrode active material, more uniform distribution and broader contact area may be realized.

The mechanical milling may be carried out according to a planetary ball milling method using a planetary ball milling device. The planetary ball milling method in the present disclosure is a method of milling a mixture by adding balls having a constant diameter.

In particular, since high impact energy is generated due to the planetary ball milling device that simultaneously performs rotation and revolution, the mixture of the sulfide based solid electrolyte and the positive electrode active material is suitably milled.

The mechanical milling is carried out under a fast rotation speed in order to completely amorphize the mixture. The mixture may be milled for 20 to 25 hours at a rotation speed of 300 to 600 RPM by planetary ball milling.

When the rotation speed and the milling time are satisfied, the sulfide based solid electrolyte and the positive electrode active material are completely amorphized, and thus, a uniformly distributed complex may be prepared.

The heat-treating is a step of crystallizing by plasticizing the amorphized mixture at high temperature. Accordingly, the positive electrode active material-solid electrolyte complex prepared through the heat-treating has a crystallized glass structure.

When the mixture in which only the mechanical milling is performed is used as it is in the complex, flexibility is good. However, since lithium ionic conductivity of the mixture is lower as compared with a complex having a crystallized glass structure, it may perform heat-treating.

The heat-treating may be performed at 210 to 250° C. When a temperature of the heat-treating is within this range, the positive electrode active material-solid electrolyte complex having improved lithium ionic conductivity may be obtained.

Hereinafter, one or more embodiments will be described in detail with reference to the following examples. However, these examples are not intended to limit the purpose and scope of the one or more embodiments in the present disclosure.

EXAMPLES

The following examples illustrate the invention and are not intended to limit the same.

(1) Mixing step

Lithium sulfide ($Li_2S$) and phosphorus pentasulfide ($P_2S_5$) were used as starting materials. In a glove box under an argon atmosphere, $50Li_2S$ as a positive electrode active material and $78Li_2S.22P_2S_5$ as a sulfide based solid electrolyte were weighted and mixed in a molar ratio, preparing a mixture.

(2) Mechanical milling step

The mixture was moved to an 100 ml alumina pot and then 12 zirconia balls having a diameter of 10 mm were added thereto. The mixture was milled for 25 hours at a rotation speed of 520 RPM, thereby amorphizing the same.

(3) Heat treatment step

The amorphized mixture was crystallized by heat-treating for three hours at 230° C., thereby preparing a positive electrode active material-solid electrolyte complex.

(4) Battery manufacturing step

A positive electrode was prepared by mixing the positive electrode active material-solid electrolyte complex, a conductive material and a binder. As the conductive materials, Ketjen black and vapor grown carbon fiber were used.

A solid electrolyte layer was formed on the positive electrode and a negative electrode was formed on the solid electrolyte layer, thereby manufacturing an all-solid-state lithium sulfur battery.

Comparative Example

The positive electrode active material and the sulfide based solid electrolyte were simply mixed in the same molar ratio as in the example, and a conductive material and a binder were mixed therewith, thereby preparing a positive electrode.

A solid electrolyte layer was formed on the positive electrode and a negative electrode was formed on the solid electrolyte layer, thereby manufacturing an all-solid-state lithium sulfur battery.

Measurement Example 1—X-ray Diffraction (XRD)

Figure 2:
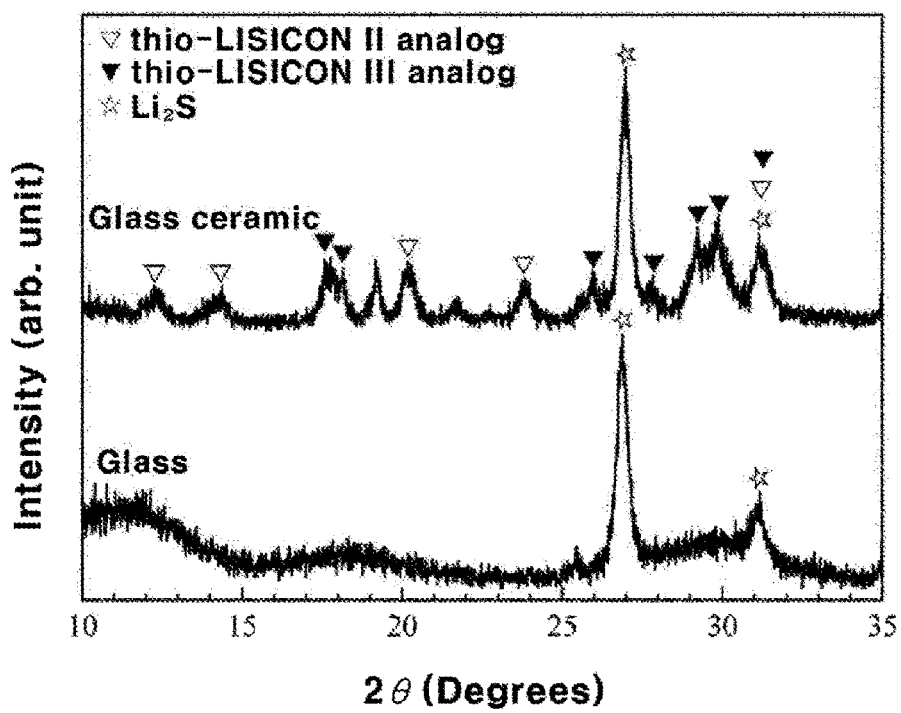
FIG. 2 illustrates an x-ray diffraction (XRD) graph of a positive electrode active material-solid electrolyte complex prepared according to an embodiment.

FIG. 2 illustrates an XRD graph of the positive electrode active material-solid electrolyte complex prepared according to the exemplary embodiment. In FIG. 2, "Glass" in the lower part illustrates an XRD graph for lithium sulfide and "Glass ceramics" in the upper part illustrates an XRD graph for the positive electrode active material-solid electrolyte complex according to the present invention.

Figure 3:
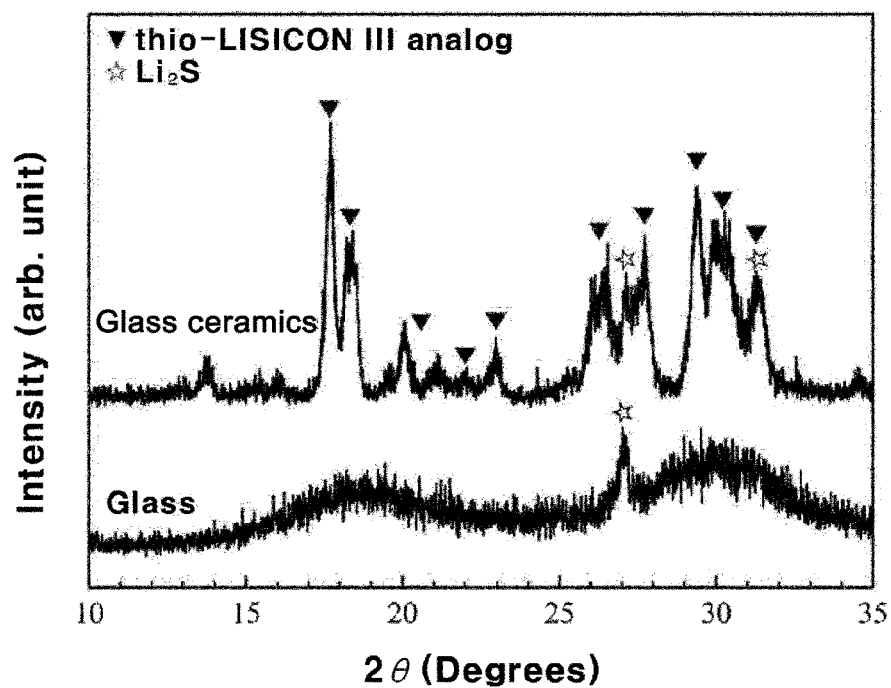
FIG. 3 illustrates an XRD graph of a sulfide based solid electrolyte according to a comparative example.

FIG. 3 illustrates an XRD graph of the sulfide based solid electrolyte according to the comparative example. In FIG. 3, "Glass" in the lower part illustrates an XRD graph for lithium sulfide and "Glass ceramics" in the upper part illustrates an XRD graph for the solid electrolyte according to the comparative example.

Referring to FIG. 2, it is confirmed that the XRD graph of the positive electrode active material-solid electrolyte complex according to the present disclosure exhibits a thio-LISICON II analog phase.

An XRD graph of $Li_2S.P_2S_5$ as a sulfide based solid electrolyte exhibits only a thio-LISICON III-similar phase as illustrated in FIG. 3. That is, there was a structural change when the positive electrode active material and the solid electrolyte were prepared into a complex.

In addition, since it was known that the thio-LISICON II analog phase had higher ionic conductivity as compared with the thio-LISICON III-similar phase, lithium ionic conductivity of an all-solid-state lithium sulfur battery may increase when the positive electrode active material-solid electrolyte complex obtained according to the preparation method of the present disclosure is used.

Measurement Example 2—Charge and Discharge Capacity Measurement of Battery

Capacities for the all-solid-state lithium sulfur battery manufactured according to the exemplary embodiment and the comparative example were measured and compared.

Figure 4:
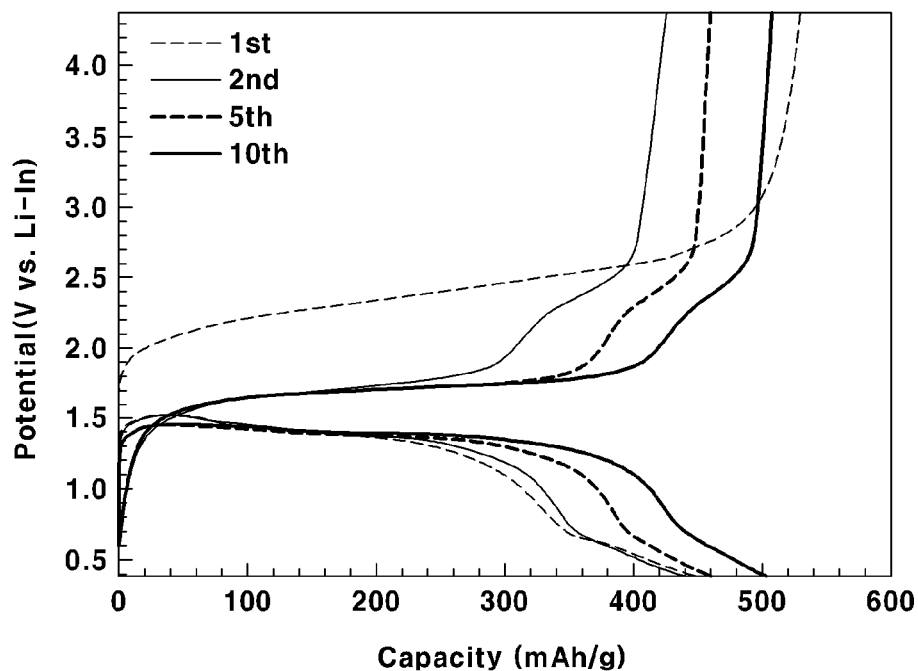
FIG. 4 illustrates graphs for charge and discharge capacities of an all-solid-state lithium sulfur battery according to an embodiment.
Figure 5:
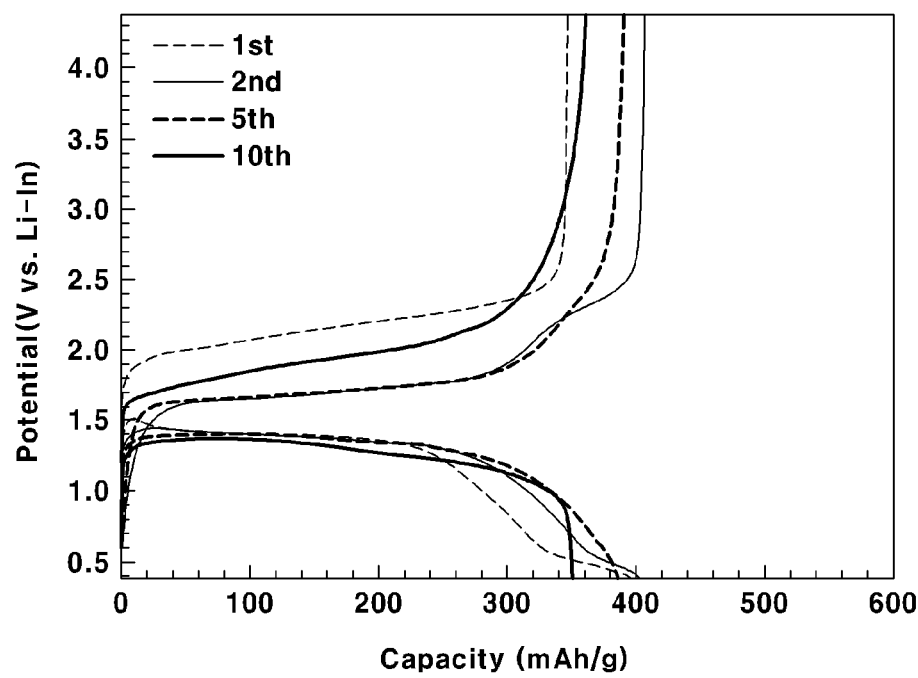
FIG. 5 illustrates graphs for charge and discharge capacities of an all-solid-state lithium sulfur battery according to a comparative example.

FIG. 4 illustrates a charge and discharge capacity measurement result for the all-solid-state lithium sulfur battery according to the exemplary embodiment. FIG. 5 illustrates a charge and discharge capacity measurement graph for the all-solid-state lithium sulfur battery according to the comparative example.

Referring to the above, it was confirmed that while the all-solid-state lithium sulfur battery according to the exemplary embodiment exhibits a charge and discharge capacity of approximately 500 mAh/g, the all-solid-state lithium sulfur battery according to the comparative example exhibits a charge and discharge capacity of approximately 400 mAh/g.

Accordingly, it is confirmed that, as compared with the case in which the positive electrode active material and the solid electrolyte were simply mixed, a charge and discharge capacity increased by preparing the complex through mechanical milling and heat-treating as described in the present invention.

The result may be made by the following: the positive electrode active material and the solid electrolyte were uniformly distributed through amorphizing, and interface resistance was decreased by extended contact area.

Measurement Example 3—Lifespan Characteristic Measurement of Battery

Lifespan of the all-solid-state lithium sulfur battery manufactured according to the exemplary embodiment and the comparative example was measured.

Figure 6:
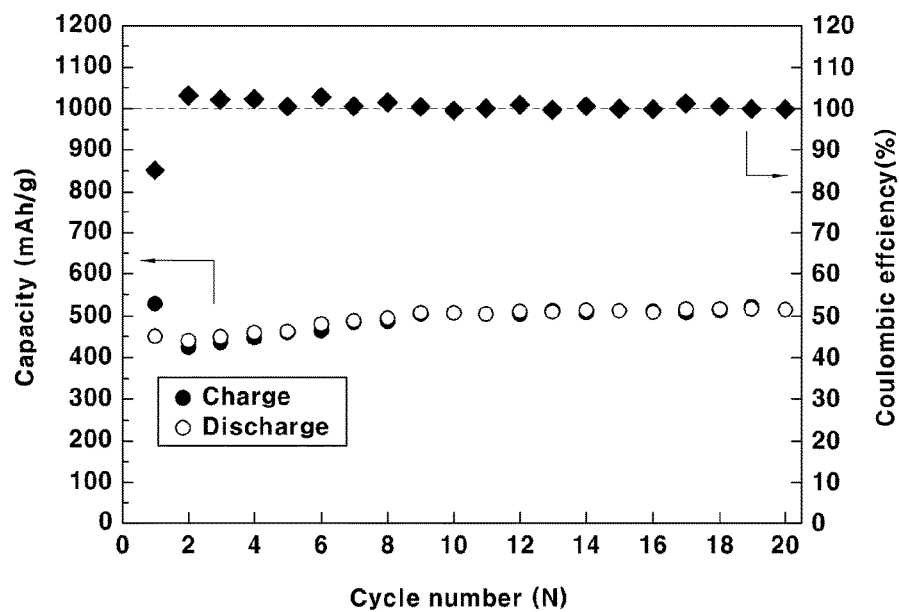
FIG. 6 illustrates capacities of an all-solid-state lithium sulfur battery according to an embodiment charged and discharged up to 20 cycles.
Figure 7:
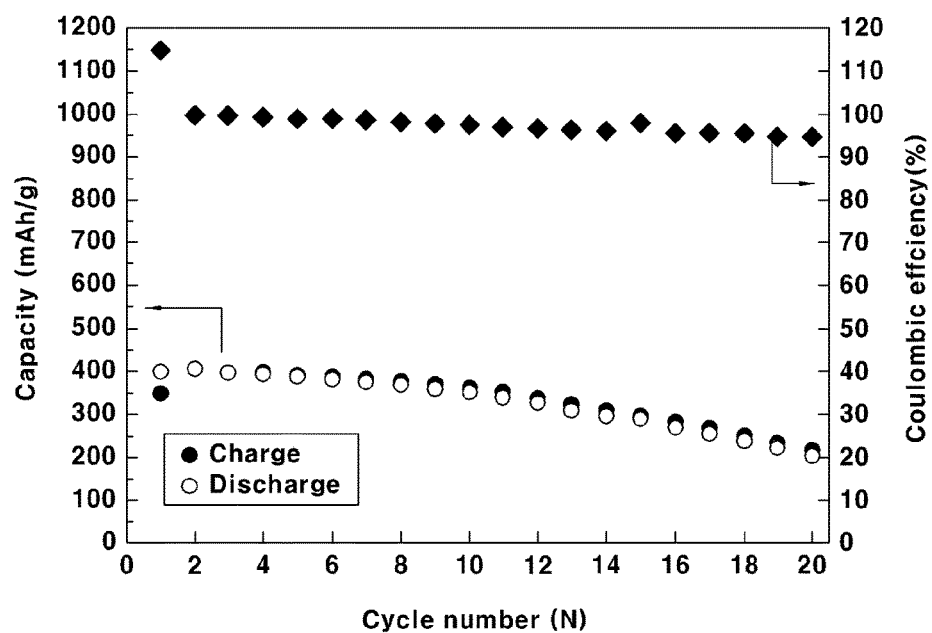
FIG. 7 illustrates capacities of an all-solid-state lithium sulfur battery according to a comparative example charged and discharged up to 20 cycles.

FIG. 6 illustrates charge and discharge capacities of the all-solid-state lithium sulfur battery according to the exemplary embodiment which was charged and discharged up to 20 cycles. FIG. 7 illustrates charge and discharge capacities of the all-solid-state lithium sulfur battery according to the comparative example which was charged and discharged up to 20 cycles.

Referring to this, it is confirmed that while the charge and discharge capacity of the all-solid-state lithium sulfur battery according to the exemplary embodiment increases until being charged and discharged up to 10 cycles and then is maintained at 500 mA/g up to 20 cycles, the charge and discharge capacity of the all-solid-state lithium sulfur battery according to the comparative example is continuously decreased as charge and discharge cycles are carried out.

This means that the positive electrode active material and the solid electrolyte are uniformly distributed in the positive electrode and interface resistance therebetween is low.

Therefore, the method according to the present disclosure may uniformly distribute the positive electrode active material and the sulfide based solid electrolyte in the positive electrode.

In addition, the method according to the present disclosure may extend the contact area between the positive electrode active material and the sulfide based solid electrolyte in a positive electrode, and may decrease interface resistance.

Accordingly, the method according to the present disclosure may increase a charge and discharge capacity and lifespan of the all-solid-state lithium sulfur battery.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of preparing a positive electrode for an all-solid-state lithium sulfur battery by mixing a positive electrode active material-solid electrolyte complex and at least one of a conductive material or a binder,
   wherein a method of preparing the positive electrode active material-solid electrolyte complex includes:
      mixing a sulfide based solid electrolyte, which includes $Li_2S$ and $P_2S_5$, and a positive electrode active material to prepare a mixture;
      milling the mixture to amorphize the mixture; and
      heat-treating the amorphized mixture,
      wherein the positive electrode active material is lithium sulfide ($Li_2S$),
      wherein the step of heat-treating is carried out at 210 to 250° C. and
      wherein the method of preparing the positive electrode active material solid electrolyte complex is prepared before mixing the positive electrode active material solid electrolyte complex with the conductive material and the binder.

2. The method of claim 1, wherein the positive electrode active material comprises lithium ions.

3. The method of claim 1, wherein the step of milling includes planetary ball milling.

4. The method of claim 1, wherein, in the step of milling, the mixture is ground for 20 to 25 hours at 300 to 600 RPM.

* * * * *